(12) United States Patent
Song et al.

(10) Patent No.: US 6,976,691 B1
(45) Date of Patent: Dec. 20, 2005

(54) MOTORCYCLE TRIPLE CLAMPS

(75) Inventors: Michael M. Song, Maple Grove, MN (US); Kevin Nelson, Osceola, WI (US); Danny Jay Fredrickson, Dresser, WI (US)

(73) Assignee: Polaris Industries Inc., Medina, MN (US)

( * ) Notice: Subject to any disclaimer, the term of this patent is extended or adjusted under 35 U.S.C. 154(b) by 0 days.

(21) Appl. No.: 10/725,204

(22) Filed: Dec. 1, 2003

Related U.S. Application Data (63) Continuation of application No. 10/612,340, filed on Jul. 1, 2003.

(51) Int. Cl.⁷ .............................................. B62K 21/02
(52) U.S. Cl. ..................................... 280/279; 280/280
(58) Field of Search ............................... 280/279, 280; 74/551.8; 296/78.1; D12/118; 180/219

(56) References Cited

U.S. PATENT DOCUMENTS

| | | | |
|---|---|---|---|
| 1,795,566 A | 1/1931 | MacComb | |
| 1,944,905 A | 1/1934 | Rowell | 180/78 |
| 2,465,825 A | 3/1949 | Tucker | 180/78 |
| 2,492,283 A | 12/1949 | Hazzard | 74/551.1 |
| 4,032,168 A | 6/1977 | Emerson | 280/279 |
| 4,368,454 A | 1/1983 | Pilatzki | 340/22 |
| 4,687,072 A | 8/1987 | Komuro | 180/219 |
| 4,700,963 A | 10/1987 | Burns et al. | 280/276 |
| 5,967,538 A | 10/1999 | Callaluca et al. | 280/279 |
| 6,154,703 A | 11/2000 | Nakai et al. | 701/200 |
| 6,176,339 B1 | 1/2001 | Reichardt | 180/219 |
| 6,176,503 B1 | 1/2001 | George | 280/274 |
| D437,571 S | 2/2001 | Mason et al. | D12/118 |
| 6,332,625 B1 | 12/2001 | Fukunaga et al. | 280/280 |
| 6,520,524 B1 | 2/2003 | Costa | 280/276 |
| 6,547,269 B2 | 4/2003 | Lane | 280/280 |
| 6,712,541 B1 | 3/2004 | Henricksen | 403/344 |

*Primary Examiner*—Tony Winner
(74) *Attorney, Agent, or Firm*—Fredrikson & Byron, P.A.

(57) ABSTRACT

An apparatus and method are provided for a triple clamp with a central recess contained therein. In combination with a removable cover, the recess can be utilized to conceal a steering stem nut of the motorcycle, as well as to contain and hold a variety of items if so desired.

19 Claims, 9 Drawing Sheets

MOTORCYCLE TRIPLE CLAMPS

This is a Continuation of application Ser. No. 10/612,340 filed Jul. 1, 2003. The entire disclosure of the prior application is considered as being part of the disclosure of this application and is hereby incorporated by reference herein.

TECHNICAL FIELD

The invention relates to attachment devices utilized for coupling a steering mechanism to a frame of a vehicle, and in particular, the invention relates to triple clamps utilized on motorcycles.

BACKGROUND OF THE INVENTION

It is believed that motorcycle owners typically place a premium on the aesthetic appearance of their motorcycles. In light of this, motorcycle manufacturers generally tend to shy away from motorcycle designs that require anything to be fixedly attached thereon (i.e., in plain view) which takes away (i.e., stands out) from the overall guise or exterior look of the cycle. The reasoning lies in the belief that such designs may be negatively received by the public, resulting in less consumer demand for such motorcycles. This concern is of particular importance in reference to the front portion of the motorcycle, as the front portion is always within plain view of a rider whenever he or she is operating the motorcycle. One component located on the front portion of the motorcycle that is in plain view and stands out is an upper portion of a fastener used to couple a head tube of a frame to upper and lower triple clamps operatively coupled to a steering mechanism of the motorcycle.

While the upper portion of the fastener does stand out, the upper portion generally needs to be in contact with, and in turn, visible on an upper surface of the upper triple clamp in order for the fastener to function as intended, namely to couple the frame to the triple clamps and facilitate the rotation of the steering fork with respect to the motorcycle frame. As such, there have been attempts to make the upper fastener portion more presentable or aesthetically pleasing in appearance. Such attempts have included flush mounting the upper fastener portion with the upper surface of the upper triple clamp, smoothing off edges of the upper fastener portion to be flush with the upper surface of the upper triple clamp, providing the upper fastener portion with a chrome finish to match the rest of the metal surfaces on the motorcycle, or even covering the upper fastener portion with a cap. While each of these attempts may have been successful to an extent, they still provide the rider with a construction that involves the upper portion of the fastener being in plain view. Further, by its very location on the motorcycle, the upper fastener portion is generally susceptible to contact with environmental elements (e.g., rain, dirt, etc.). As such, the upper fastener portion may be susceptible to corrosion, discoloring, blemishing, etc. brought on by its contact with the environmental elements. If this corrosion, discoloring, blemishing, etc. did occur, it would make the upper fastener portion even more likely to stand out to the consumer.

SUMMARY OF THE INVENTION

According to a first aspect of the invention, there is provided a motorcycle. The motorcycle comprises a frame, a steering fork, a lower triple clamp, an upper triple clamp, a cap, and a fastener assembly. The steering fork has a pair of fork tubes. The lower triple clamp is rotatably coupled to the frame and operatively coupled to the pair of fork tubes such that the fork tubes rotate relative to the frame. The upper triple clamp is rotatably coupled to the frame and operatively coupled to the pair of fork tubes such that the fork tubes rotate relative to the frame. The upper triple clamp has an upper surface having a recess therein including a bottom surface with at least one aperture. The cap is secured on the upper surface of the upper triple clamp wherein the cap is adapted to conceal the recess in the upper surface. The fastener assembly is adapted to rotatably couple the frame to the upper and lower triple clamps.

According to a second aspect of the invention, there is provided a motorcycle. The motorcycle comprises a frame, a steering fork, a lower triple clamp, an upper triple clamp, a cap, and a fastener assembly. The steering fork has a pair of fork tubes. The lower triple clamp is rotatably coupled to the frame and operatively coupled to the pair of fork tubes such that the fork tubes rotate relative to the frame. The upper triple clamp is rotatably coupled to the frame and operatively coupled to the pair of fork tubes such that the fork tubes rotate relative to the frame. The upper triple clamp has an upper surface having a recess therein. The cap is secured on the upper surface of the upper triple clamp wherein the cap is adapted to conceal the recess and adapted to hold an indicator light. The fastener assembly is adapted to rotatably couple the frame to the upper and lower triple clamps.

According to a third aspect of the invention, there is provided a method of concealing a motorcycle steering stem nut while still keeping the steering stem nut accessible. The method involves providing a motorcycle and removing a first upper triple clamp from the motorcycle. A second upper triple clamp is provided having an upper surface with a recess including a bottom surface with at least one aperture. The second upper triple clamp is secured to the motorcycle. A cap is provided that is configured to mount on the upper surface of the second upper triple clamp and sized to substantially cover the recess therein. The cap is secured to the upper surface of the second upper triple clamp.

According to a fourth aspect of the invention, there is provided a motorcycle triple clamp. The motorcycle triple clamp comprises a body having an upper surface and a lower surface and a continuous side surface connecting the outer edges of the upper and lower surfaces. The upper surface has a recess therein including a bottom surface with at least one aperture. The body defines two outer openings each adapted for receiving a fork tube therein, and the body further defines two inner openings each adapted for operatively receiving a riser tube therein.

DETAILED DESCRIPTION OF THE PREFERRED EMBODIMENTS OF THE INVENTION

The following detailed description is to be read with reference to the drawings, in which like elements in different figures have like reference numerals. The drawings, which are not necessarily to scale, depict selected embodiments, but are not intended to limit the scope of the invention. It will be understood that many of the specific details of the vehicle incorporating the system illustrated in the drawings could be changed or modified by one of ordinary skill in the art without departing significantly from the spirit of the invention. The triple clamp of the invention is designed for use on vehicles such as motorcycles, however it may be used on other vehicles such as mopeds, scooters, bicycles, all-terrain vehicles, and the like.

Figure 1:
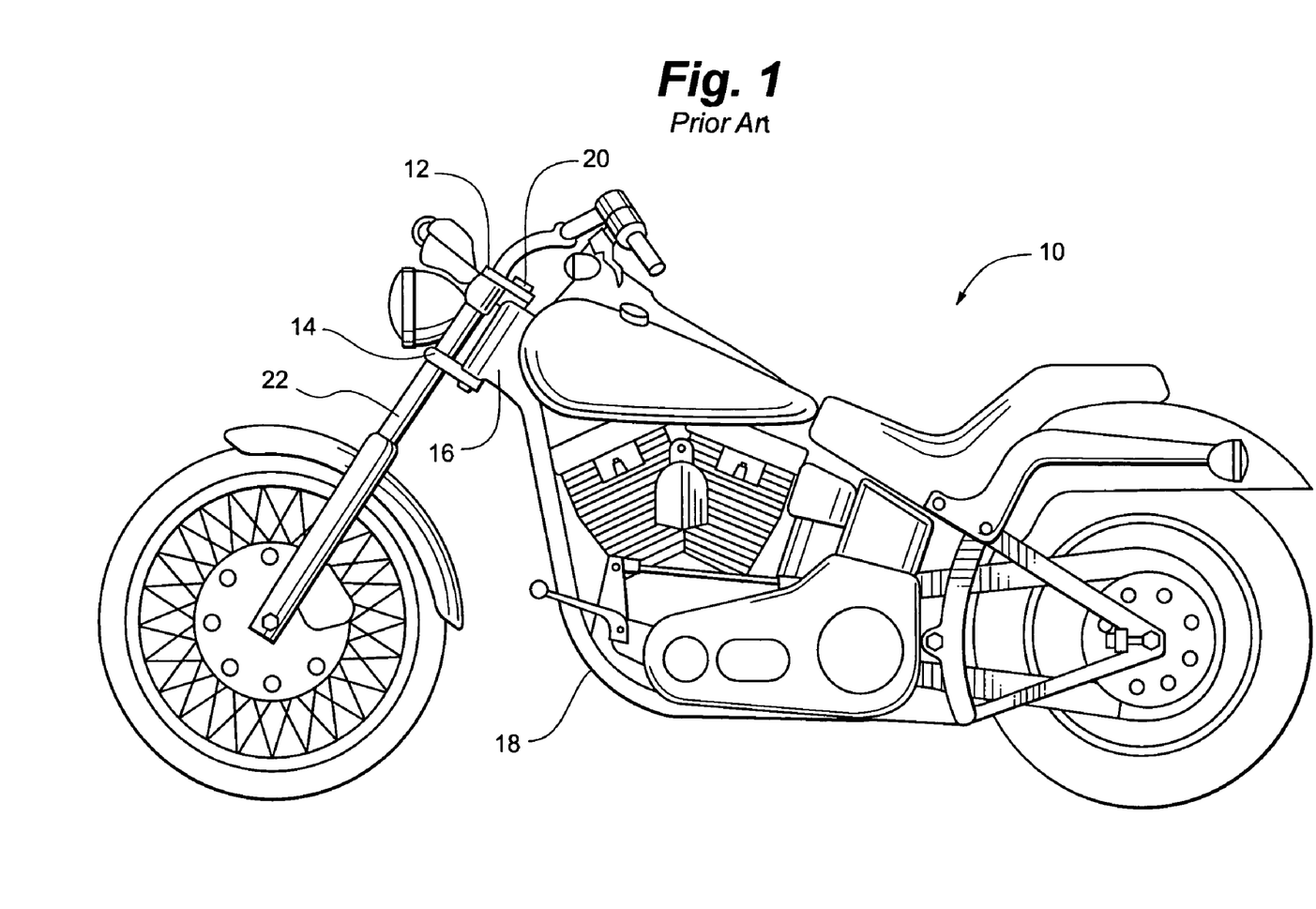
FIG. 1 is a schematic side view of a motorcycle illustrating a prior art triple clamp design.

FIG. 1 shows a side view of a motorcycle 10 according to the prior art, illustrating a generally-known triple clamp design. The motorcycle 10 has an upper triple clamp 12 and a lower triple clamp 14, which are respectively positioned above and below a head tube 16 (only one outer side surface is visible in FIG. 1) of a frame 18 of the motorcycle 10. As shown, a fastener 20 is utilized in conjunction with the triple clamps 12, 14 to couple the head tube 16 to the triple clamps 12, 14, while the triple clamps 12, 14 are also operatively coupled to the steering fork via fork tubes 22 (only one is visible in FIG. 1). By positioning the upper and lower triple clamps 12 and 14 respectively above and below the head tube 16 of the frame 18, the fastener 20 is subsequently used to couple the triple clamps 12, 14 and the head tube 16 such that the triple clamps 12, 14 along with the steering fork may rotate with respect to the frame 18 of the motorcycle 10. The fastener 20, while being positioned between the triple clamps 12, 14, generally has an upper portion that is in contact with and visible on the upper surface of the upper triple clamp 12. Generally, the upper portion of the fastener 20 is the steering stem nut, which may be optionally covered by a chrome or decorative cap. As depicted, the steering stem nut 20 (or the steering nut/cap assembly, if such cap is used) can be visually observed from the side of the motorcycle 10 as well as to an operator of the motorcycle 10. In some cases, as also depicted, a lower end of the fastener can be visually observed from the side of the motorcycle 10.

Figure 2:
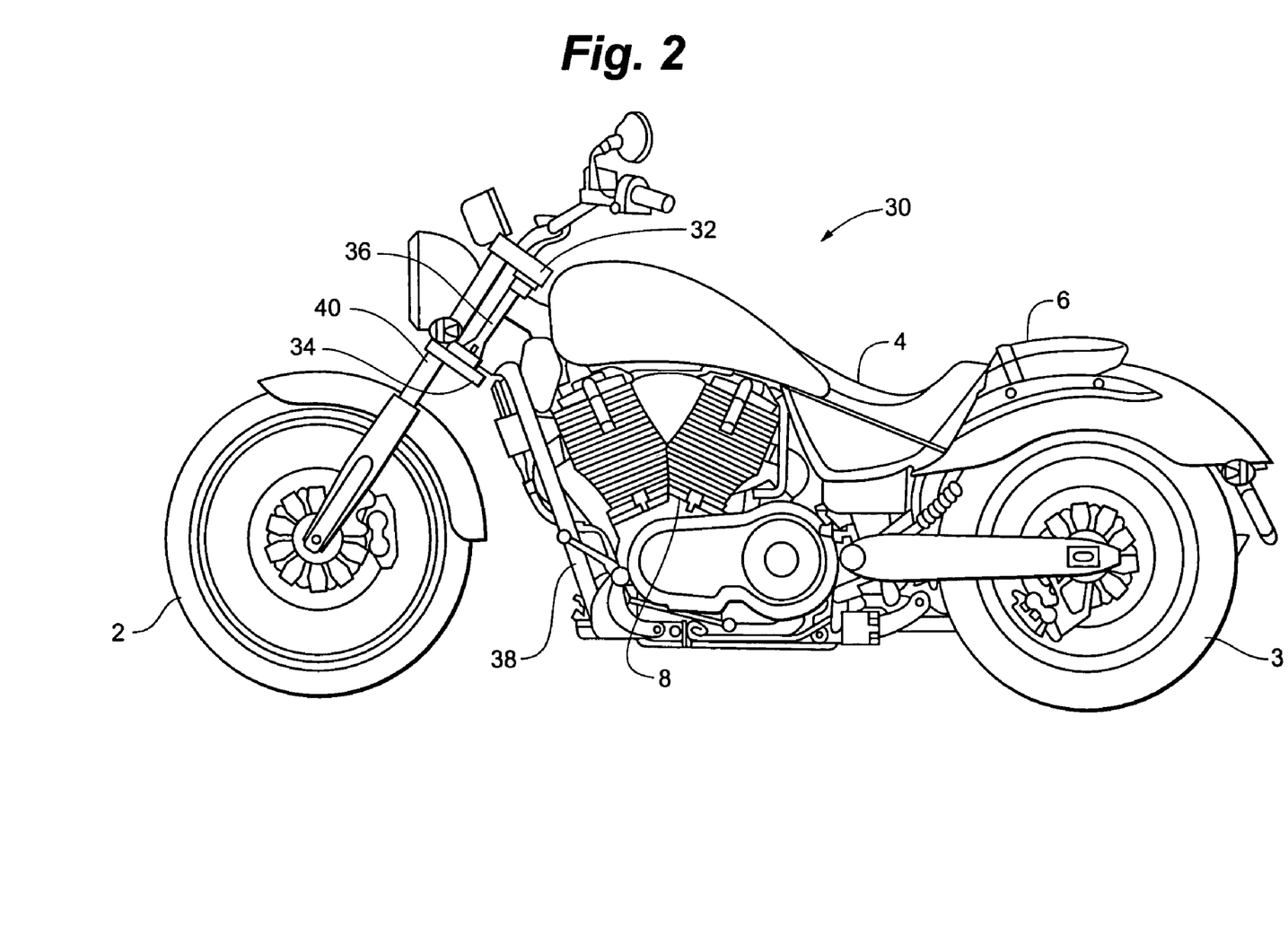
FIG. 2 is a schematic side view of a motorcycle in accordance with certain embodiments of the invention.

FIG. 2 illustrates a side view of a motorcycle 30 in accordance with certain embodiments of the invention. The motorcycle 30 has a front wheel 2, a rear wheel 3, a driver seat 4, a passenger seat 6, and an engine 8. Additionally, the motorcycle 30 in FIG. 2 has an upper triple clamp 32 and a lower triple clamp 34, which are respectively positioned above and below a head tube 36 of a frame 38 of the motorcycle 30. In addition, a fastener is used to secure the triple clamps 32, 34 to the head tube 36, however, unlike the motorcycle 10 in FIG. 1, the fastener neither has an upper end nor a lower end protruding from either the upper triple clamp 32 or the lower triple clamp 34. Thus, in certain preferred embodiments of the invention, while the fastener is still utilized in a similar fashion and is positioned in a similar location between the triple clamps 32, 34, the fastener will be substantially hidden from view.

Figure 3:
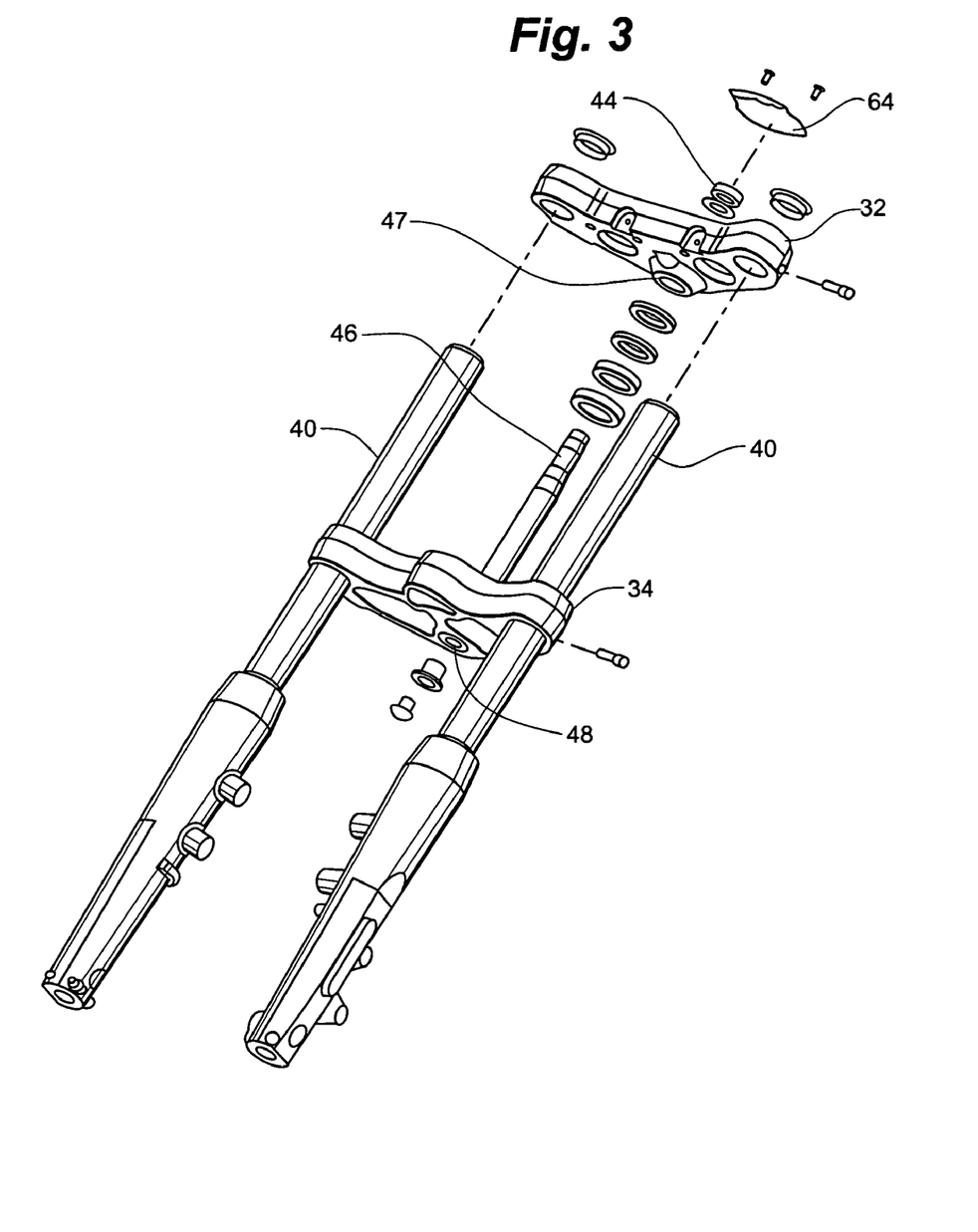
FIG. 3 is a schematic, exploded side perspective view of an assembly involving a front fork and upper and lower triple clamps in accordance with certain embodiments of the invention.

FIG. 3 shows an exploded side perspective view of an assembly including the fastener and the triple clamps 32, 34 in accordance with certain embodiments of the invention. Also illustrated in the exploded view of the assembly are front forks 40 (also shown in FIG. 2). As shown, the fastener is a fastener assembly having an upper portion 44 and a lower portion 46. The upper portion 44 of the fastener assembly, as described above, preferably is the steering stem nut, while the lower portion 46 of the fastener assembly preferably is a steering stem, i.e., generally a rod with a threaded upper end. As shown, the lower portion 46 extends between corresponding apertures 47 and 48 defined respectively by the upper and lower triple clamps 32 and 34. Although not illustrated in FIG. 3, the lower portion 46 of the fastener assembly also extends through the head tube 36 of the motorcycle frame 38 (FIG. 2). In certain preferred embodiments of the invention, the upper and lower portions of the fastener assembly 44 and 46, are configured to be operatively coupled together. In certain particularly preferred embodiments, an inner surface of the upper portion 44 of the fastener assembly is threaded. As such, the upper threaded end of the lower portion 46 of the fastener assembly can threadably receive the upper portion 44 of the fastener assembly subsequent to the upper threaded end being inserted through the aperture 47 in the upper triple clamp 32. In certain preferred embodiments of the invention, the lower end of the lower portion 46 of the fastener assembly is molded within the corresponding aperture 48 of the lower triple clamp 34. Once the upper and lower portions, 44 and 46 respectively, of the fastener assembly are operatively coupled, a removable cap 64 is mounted to the upper surface of the upper triple clamp to conceal the coupling.

Figure 4:
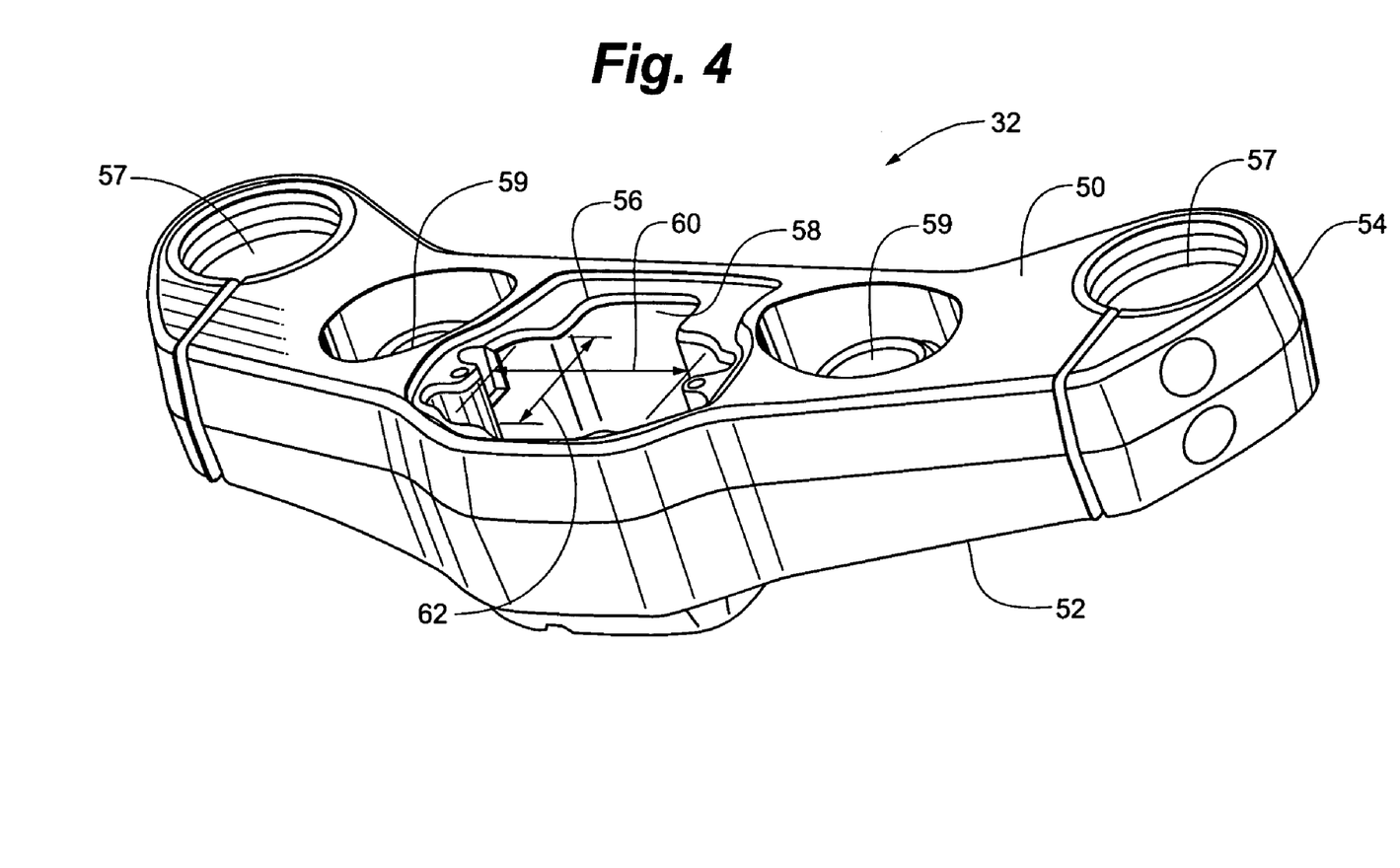
FIG. 4 is a schematic, side perspective view of an upper triple clamp in accordance with certain embodiments of the invention.

FIG. 4 illustrates a side perspective view of the upper triple clamp 32 in accordance with certain embodiments of the invention. The upper triple clamp 32 has an upper surface 50, a lower surface 52, and a continuous side surface 54 connecting the upper and lower surfaces 50 and 52, respectively. The upper surface 50 of the upper triple clamp 32 includes a central recess 56 having a bottom surface (shown in FIG. 5) and a continuous side wall 58. The bottom surface of the recess 56 includes the aperture 47 (shown in FIG. 3), which is utilized for insertion therein of the upper threaded end of the lower portion 46 of the fastener assembly. The aperture 47 located in the bottom surface of the recess 56 is described and depicted as singular, but it is contemplated that the aperture 47 may also comprise a plurality of apertures 47 as well to function either with one or a plurality of fastener assemblies. Additionally, the upper triple tube 32 includes two outer openings 57 each adapted for receiving a fork tube 40 (shown in FIGS. 2 and 3) therein. The upper triple tube 32 additionally includes two inner openings 59 each adapted for operatively receiving a riser tube (not shown) therein.

Figure 5:
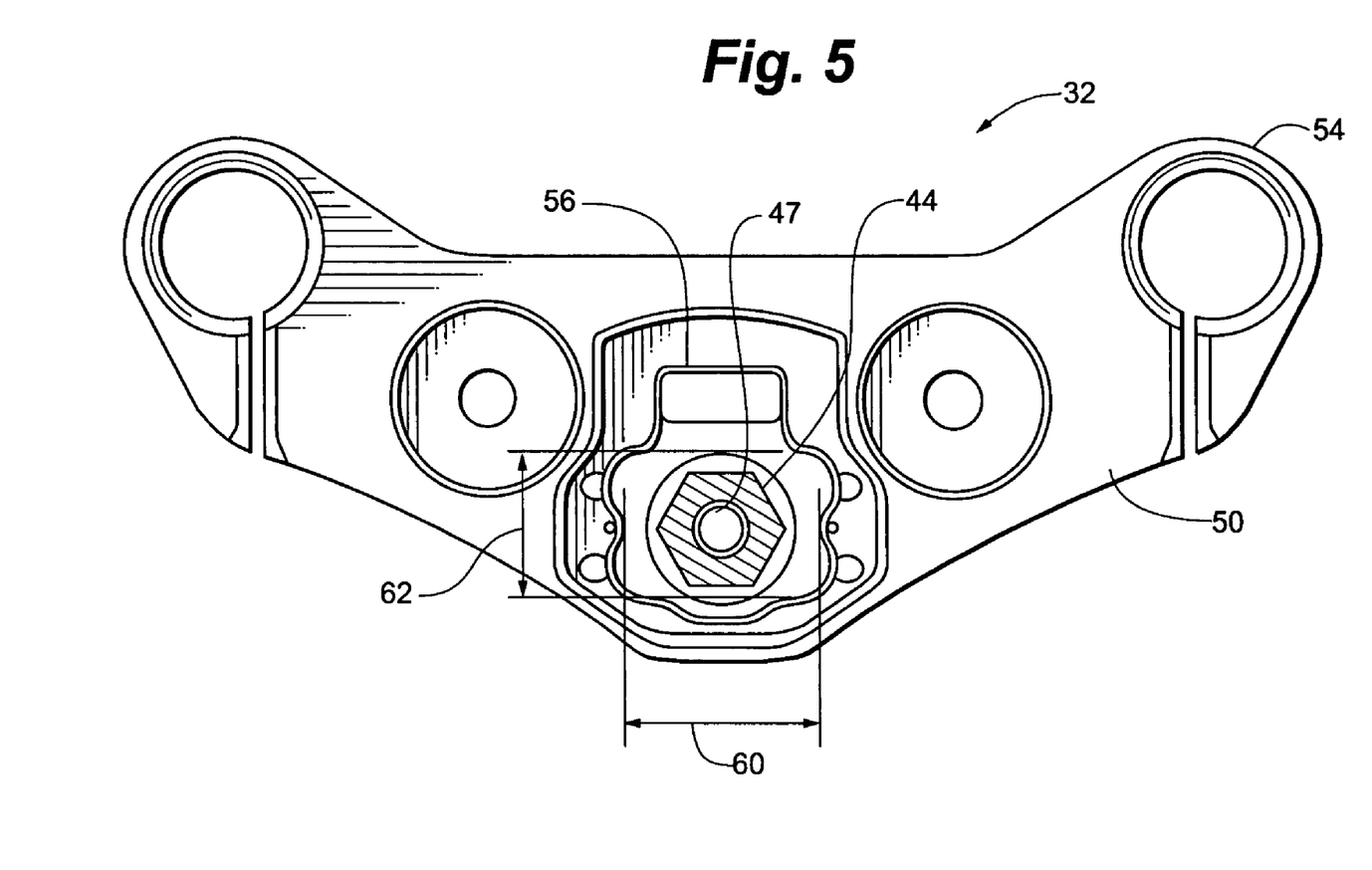
FIG. 5 is a schematic, upper elevation view of an upper triple clamp in accordance with certain embodiments of the invention.

As shown in FIGS. 4 and 5, the recess 56 in the upper surface 50 of the upper triple clamp 32 is configured with an inner length dimension 60 and an inner width dimension 62 that are greater than an outer length dimension and an outer width dimension of the upper portion 44 of the fastener assembly. This size restriction on the inner dimensions 60 and 62 of the recess 56 also applies in regard to any additional hardware, e.g., washers, rubber gaskets, etc., used with the upper portion 44 of the fastener assembly and housed within the recess 56. As mentioned above, the upper portion 44 of the fastener assembly preferably is a steering stem nut. In certain preferable embodiments of the invention, based on the shape of the nut, the recess 56 would need both appropriate inner length and inner width dimensions, 60 and 62 respectively, to enable the nut to be rotated therein, and in turn, to be loosened or tightened onto the upper threaded end of the lower portion 46 of the fastener assembly. For example, if the nut were square-shaped, both the inner length and inner width dimensions, 60 and 62 respectively, of the recess 56 would need to be greater than a distance measured from one corner of the nut to a diagonal corner of the nut. In certain particularly preferred embodiments of the invention, the recess 56 would have inner length and width dimensions, 60 and 62 respectively, greater then a diameter of a particular socket head. As such, the socket head, when engaged with an appropriate socket wrench, could be engaged with the nut, and used as a more efficient means for loosening or tightening the nut in relation to the steering stem. Alternatively, if the steering nut was hexagonal (as shown in FIG. 5), the recess 56 would need both inner length and inner width dimensions, 60 and 62 respectively, to be greater than the distance measured between two opposing corners of the nut.

In certain preferable embodiments of the invention, the aperture 47 in the bottom surface of the recess 56 (shown in FIGS. 3 and 5) is sized to be greater in diameter than the upper threaded end of the lower portion 46 of the fastener assembly (as well as the diameter of additional hardware used as mentioned above) but lesser in diameter than the upper portion 44 of the fastener assembly. Thus, when the upper and lower portions, 44 and 46 respectively, of the fastener assembly are coupled, the upper portion 44 (and additional hardware) will be held or supported by the bottom surface of the recess 56, while the upper threaded end of the lower portion 44 of the fastener assembly will freely pass through the aperture 47. The recess 56 is also preferably configured to have a depth dimension, i.e., measured from the bottom surface of the recess 56 to the upper surface 50 of the upper triple clamp, that is greater than the depth dimension of the upper portion 44 of the fastener assembly (combined with a depth dimension of additional hardware used as mentioned above). In turn, the upper portion 44 of the fastener assembly (and additional hardware) would fit completely within the recess 56 subsequent to the upper portion 44 being coupled to the upper threaded end of the lower portion 46 of the fastener assembly.

It is contemplated that the fastener utilized in an embodiment of the invention may also include a fastener assembly having an upper portion being comprised of a bolt having a threaded lower portion. In turn, the lower portion of the fastener assembly would be comprised of a steering stem having an inner recess on its upper end that is threaded in order to appropriately accept the threaded lower portion of the bolt. In this contemplated embodiment, similar to the above described embodiment with the upper portion 44 comprising the steering nut, the recess 56 would need to be sized accordingly with inner length and inner width dimensions, 60 and 62 respectively, in order for the bolt head (and any additional hardware used as mentioned above) to fit within. In addition, such inner dimensions for the recess 56 would allow the nut to be freely rotated therein. Also, the aperture 47 in the bottom surface of the recess 56 would need to be sized greater in diameter than the lower threaded portion of the bolt (as well as the diameter of additional hardware used as mentioned above) but lesser in diameter than the bolt head of the upper portion of the fastener assembly. Thus, when the upper and lower portions of the fastener assembly are coupled, the bolt head of the upper portion (and additional hardware) would be held or supported by the bottom surface of the recess 56, while the threaded lower portion of the fastener assembly would freely pass through the aperture 47. Further, the recess 56 would preferably be configured to have a depth dimension, i.e., measured from the bottom surface of the recess 56 to the upper surface 50 of the upper triple clamp, that is greater than the depth dimension of the bolt head of the upper portion of the fastener assembly (combined with a depth dimension of additional hardware used as mentioned above). In turn, the bolt head (and additional hardware) would fit completely within the recess 56 subsequent to the upper portion being coupled to the upper end of the lower portion of the fastener assembly.

It is further contemplated that the fastener utilized with the invention may include a single-piece fastener having a bolt head on its upper end. Additionally, the fastener could involve a variation of what has been described above. In turn, similar design considerations in regards to what has been described above, i.e., regarding the recess 56 and the aperture 47 contained therein, would need to be addressed in order for the fastener to function as intended with the invention. While only three fastener types are described herein, it is not done so with the intent to limit the applicability of the invention as such. It is fully contemplated that numerous different fastener types may be utilized without departing from the spirit of the invention.

Figure 6:
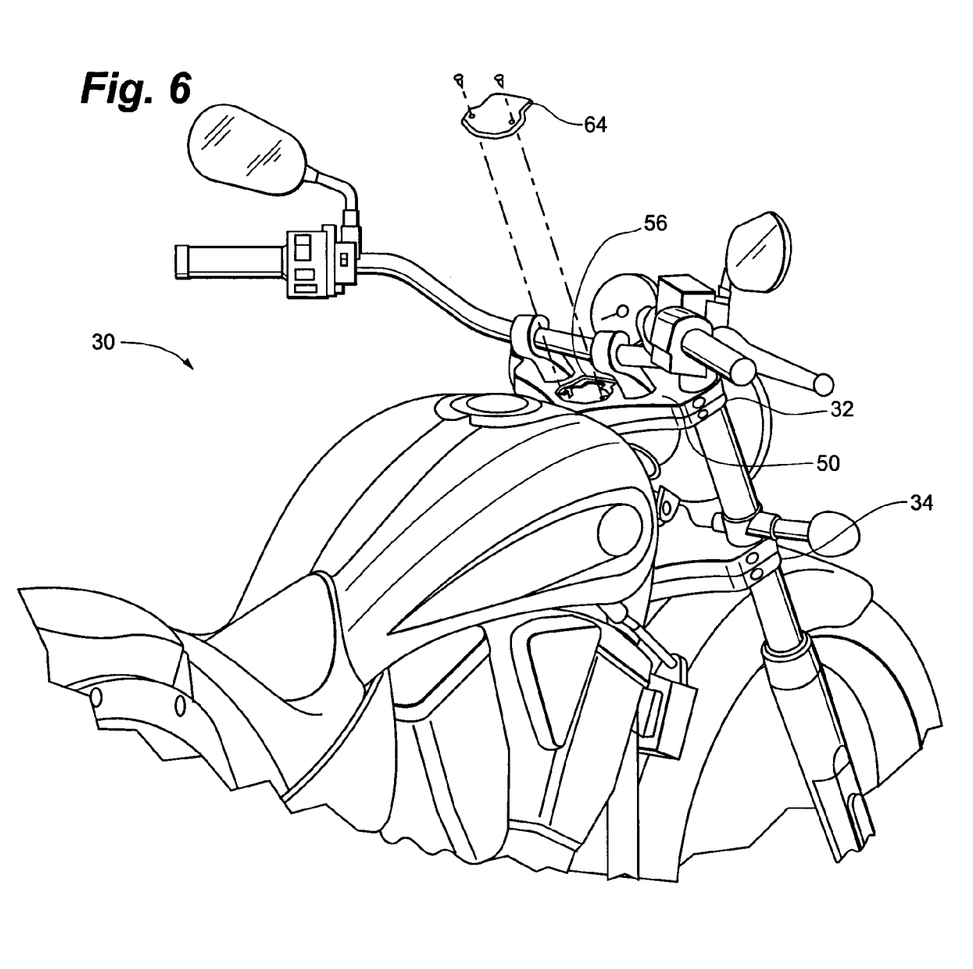
FIG. 6 is a schematic, side perspective view of the front portion of the motorcycle of FIG. 2, illustrating an exploded assembly in accordance with certain embodiments of the invention.

FIG. 6 shows a side perspective view of the front portion of the motorcycle 30 of FIG. 2 in accordance with certain embodiments of the invention. As illustrated, with the recess 56 in the upper surface 50 of the upper triple clamp 32 and the corresponding aperture 47 (shown in FIGS. 3 and 5) located in the bottom surface of the recess 56, the upper portion 44 of the fastener assembly, i.e., the steering nut, is contained within the recess 56, yet concealed from persons viewing the motorcycle 10 from the side. In accordance with certain particularly preferable embodiments of the invention, the removable cap 64 mentioned above is secured over the recess 56 in order to further conceal the upper portion 44 of the fastener assembly from persons viewing the motorcycle 10 from topside. The removable cap 64 is configured to mount on the upper surface 50 of the upper triple clamp 32 and sized to substantially cover the recess 56. In particularly preferred embodiments, the cap 64 is sized to completely cover the recess 56. In certain preferable embodiments, the cap 64 will be formed of a material, e.g., plastic, that is less dense than the material of the upper triple clamp 32, e.g., aluminum. However, in other embodiments, the cap 64 may be formed of a material of the same or greater density than the material of the upper triple clamp 32.

Figure 7:
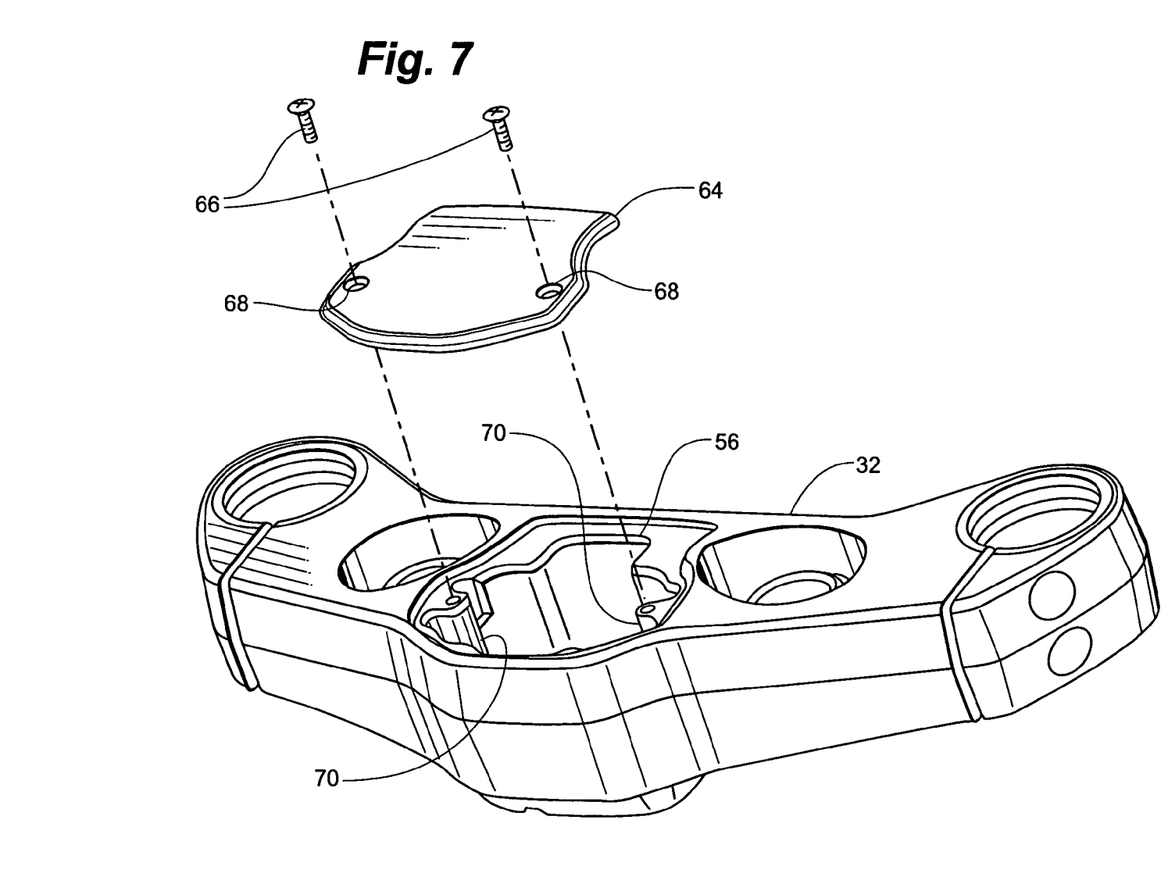
FIG. 7 is a schematic, side perspective view of the exploded assembly of FIG. 5.

While there are a variety of ways that the cap 64 could be mounted to the upper surface of the upper triple clamp, one mounting embodiment would involve at least one fastener (e.g., a screw) being inserted through a bore defined by the cap 64 and subsequently threaded into a corresponding boss defined by the continuous side wall 58 of the recess 56 of the upper triple clamp 32. FIG. 7 illustrates a mounting embodiment in accordance with certain embodiments of the invention, showing an exploded assembly comprising two mounting screws 66, the removable cap 64 having two bores 68, and the upper triple clamp 32 having two threaded bosses 70. With this mounting embodiment, while the upper portion 44 of the fastener assembly (i.e., the steering stem nut) is concealed, in order to secure the cap 64 to the upper triple clamp 32, at least one additional fastener (i.e., the mounting screws 66), each of which includes an upper portion, would be in plain view on the upper surface 50 of the upper triple clamp 32. While these fasteners would not be concealed, there are still advantages to this solution over the prior attempts mentioned above. First, the upper portion of the at least one fastener would be much smaller in size (i.e., length, width, and depth) than the upper portion 44 of the fastener assembly, perhaps ½ of the size of the upper portion 44 of the fastener assembly, more preferably ⅛ of the size, and perhaps optimally 1/64 of the size of the upper portion 44 of the fastener assembly. Thus, the upper portion of the at least one fastener would be less distinctive than the upper portion 44 of the fastener assembly. In addition, the at least one fastener may be preferably positioned so that it is not centrally located, in contrast to the upper portion 44 of the fastener assembly in known upper triple clamp designs. Further, the at least one fastener could be comprised of more than one fastener. With additional fasteners being utilized, the function of securing the cap 64 would be correspondingly divided among the fasteners. In turn, the size of the at least one fastener may be reduced even further, with this reduction corresponding to the number of fasteners actually used to secure the cap 64.

Other mounting embodiments involving the cap 64 in accordance with the invention may not comprise the use of fasteners. One of these embodiments may involve a friction fit between the cap 64 and the continuous side wall 58 of the recess 56 in the upper surface 50 of the upper triple clamp 32. Specifically, the underside of the cap 64 could be comprised of outwardly protruding rubber tabs that could be pushed inward as the cap 64 was placed on the recess 56. Subsequently, the tabs would move back to an outward orientation and contact the wall 58 of the recess 56 once the tabs were released. The contact between the tabs and the wall 58 would provide a friction fit that would hold the cap 64 in place over the recess 56. Other embodiments may include using a continuous rubber lip attached to the underside of the cap 64 which would insert and frictionally fit within the inner wall 58 of the recess 56, or using inserts attached to the underside of the cap 64 which would align and operatively couple with bosses located inside the recess 56, or using spring loaded tabs attached to the underside of the cap 64 which would frictionally fit with the inner wall 58 of the recess 56, or using other like non-fastener embodiments.

Figure 8:
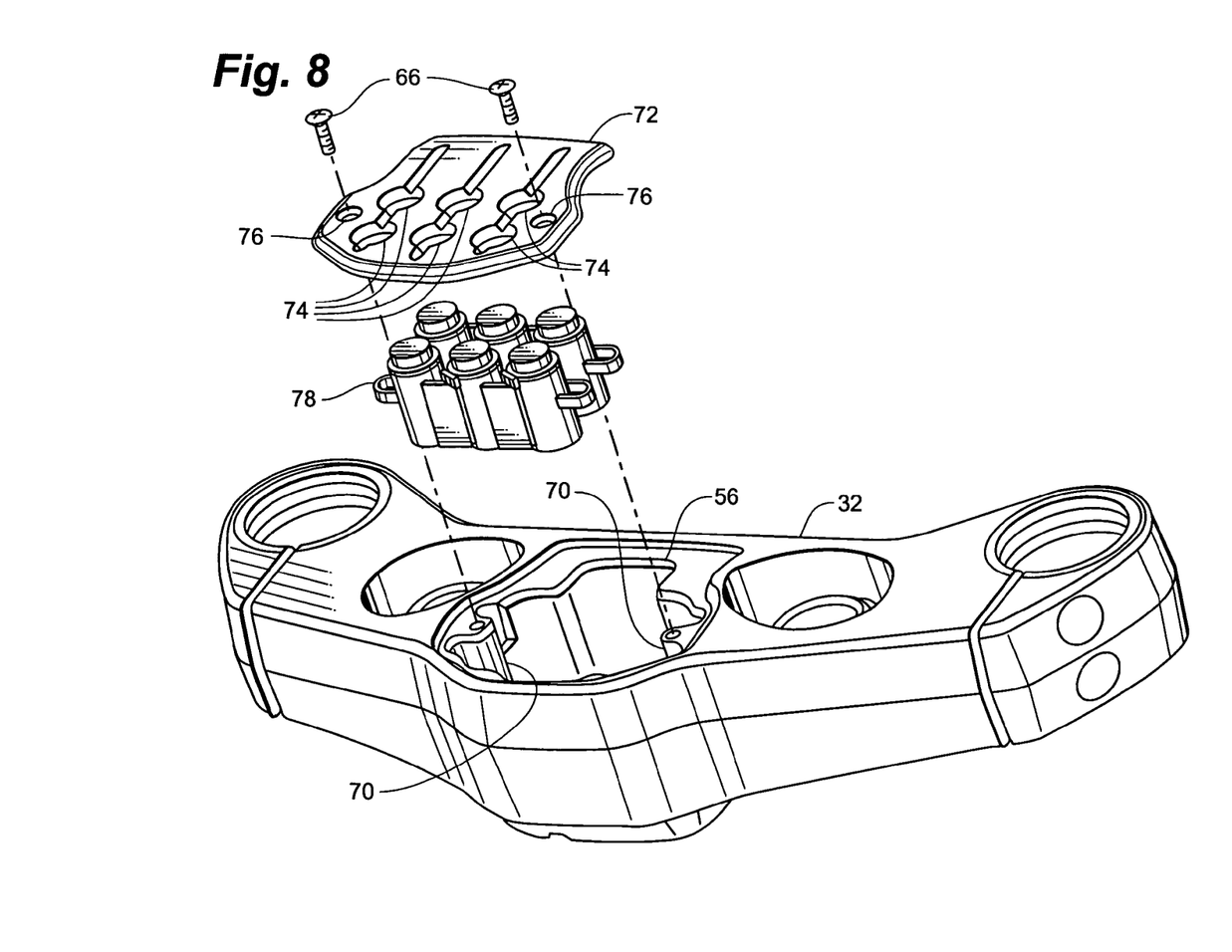
FIG. 8 is a schematic, exploded side perspective view of an upper triple clamp in accordance with certain embodiments of the invention.

While it has been described and illustrated that the recess 56 in the upper surface 50 of the upper triple clamp 32 may be utilized to conceal the upper portion 46 of the fastener assembly (e.g., the steering stem nut) of the motorcycle 30, the recess 56 along with the cap 64 may be further utilized as a housing for the rider to keep various items therein, such as money, wallet, candy, etc. which may not be easily carried while riding the motorcycle 30. Certain embodiments in accordance with the invention contemplate the cap 64 being simple to remove, and in turn, enabling the recess 56 to be used as a container for the rider. In addition, the cap 64 could be operatively coupled on its inner surface to the wall 58 of the recess 56, via hinges or swing brackets, allowing easy opening and closing operation for the cap 64 while keeping the coupling mechanisms hidden within the recess 56 when the cap 64 is secured over the recess 56. In addition, the cap 64 could be further provided with a locking mechanism (e.g., key lock) that secures the cap 64 to the upper triple clamp 32, and allows for keeping more valuable items in the recess 56 underneath the locked cap. Finally, the recess 56 could be utilized as a holder for an indicator light assembly, enabling the display of parameters or conditions of the motorcycle in regards to gear position, headlight intensity, fuel level, engine oil level, engine temperature, turn-signal functioning, etc. through apertures in the cap 64. FIG. 8 shows such a mounting embodiment in accordance with certain embodiments of the invention, illustrating an exploded assembly comprising the two mounting screws 66, a cap 72 having six indicator light apertures 74 and two mounting bores 76, a indicator light assembly 78, and the upper triple clamp 32 having two threaded bosses 70.

Figure 9:
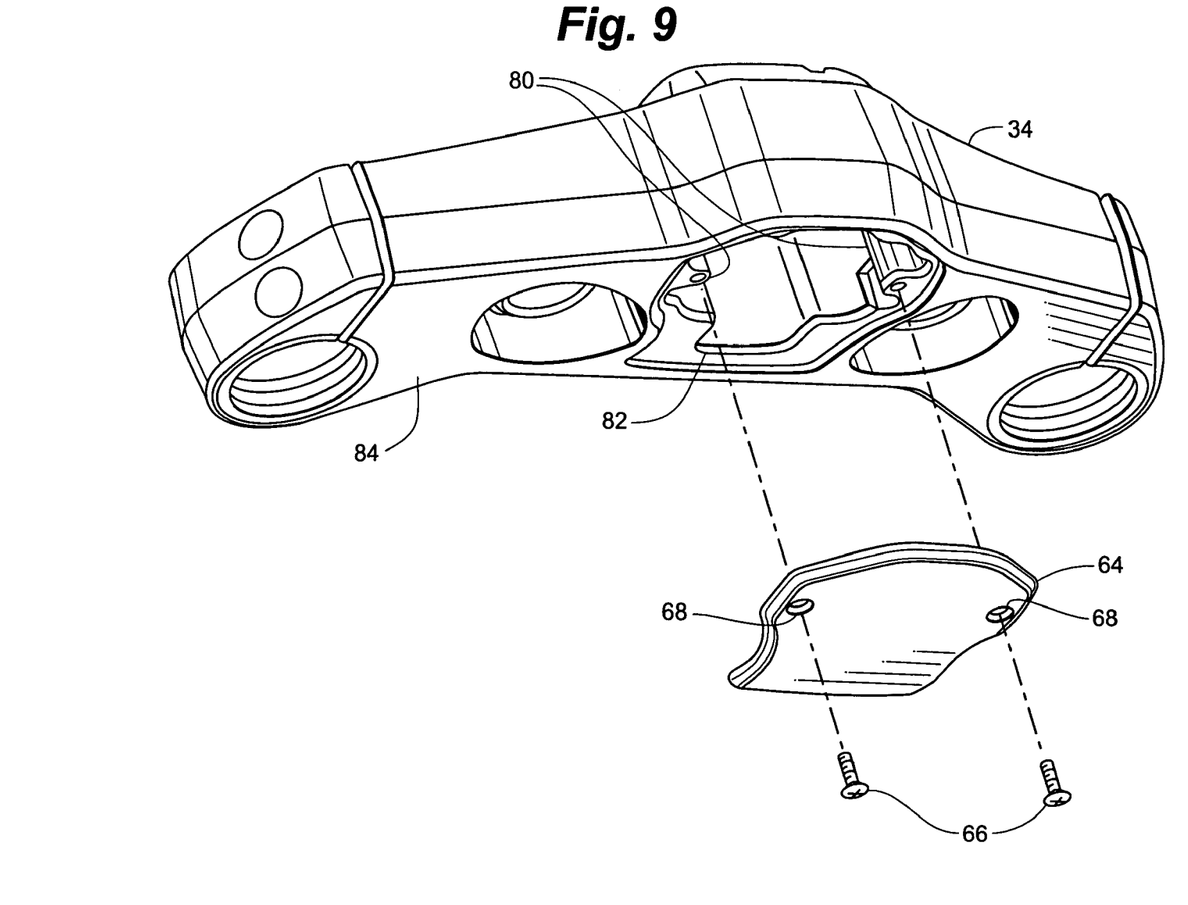
FIG. 9 is a schematic, exploded side perspective view of a lower triple clamp in accordance with certain embodiments of the invention.

While the upper triple clamp 32 is illustrated and described herein in accordance with certain embodiments of the invention, it is contemplated that the following description and teaching may also apply to the lower triple clamp 34 as well without departing from the spirit of the present invention. FIG. 9 illustrates a mounting embodiment in accordance with certain embodiments of the invention, showing an exploded assembly comprising two mounting screws 66, the removable cap 64 having two bores 68, and the lower triple clamp 34 having two threaded bosses 80. As shown, the lower triple clamp 34 has a recess 82 in its lower surface 84 and a corresponding cap 64 that substantially covers the recess 82. In turn, if a design required coupling the lower end of the lower portion 46 of the fastener assembly to a fastener within the lower triple clamp 34, the fastener could be concealed as well in light of this invention. Further, if the lower triple clamp 34 were configured in accordance with the teachings described above (i.e., having the recess 82 and aperture 48 (not shown) located in the recess 82 sized appropriately), it is contemplated that the upper portion 44 of the fastener assembly could be fully concealed and housed within the recess 82 of the lower triple clamp 34.

In reversing the orientation of the fastener assembly, i.e., housing the upper portion 44 of the fastener assembly in the lower triple clamp 34, the upper triple clamp 32 would not have to be used to conceal the upper portion 44 of the fastener assembly. Thus, in applications where there was no ulterior purpose for the upper triple clamp 32 to have a recess 56 (i.e., to provide a container for carrying items, to provide a housing for the indicator light assembly 78, etc.), it is contemplated that the fastener assembly could be rotated 180° so that the lower triple clamp 34 were used to house and conceal the upper portion 44 of the fastener assembly instead.

While a preferred embodiment of the present invention has been described, it should be understood that various changes, adaptations, and modifications may be made therein without departing from the spirit of the invention and the scope of the appended claims.

What is claimed is:

1. A motorcycle comprising:
    a frame;
    a steering fork having a pair of fork tubes;
    a lower triple clamp rotatably coupled to the frame and operatively coupled to the pair of fork tubes such that the fork tubes rotate relative to the frame;
    an upper triple clamp rotatably coupled to the frame and operatively coupled to the pair of fork tubes such that the fork tubes rotate relative to the frame, the upper triple clamp having an upper surface, the upper surface having a recess therein;
    a cap secured on the upper surface of the upper triple clamp wherein the cap is adapted to conceal the recess and adapted to hold an indicator light, the indicator light being integral to an indicator light assembly contained within the recess of the upper triple clamp; and a fastener assembly adapted to rotatably couple the frame to the upper and lower triple clamps.

2. The motorcycle of claim 1, wherein the recess comprises a bottom surface having at least one aperture.

3. The motorcycle of claim 2, wherein the fastener assembly comprises lower and upper ends, the lower end being operatively coupled to the lower triple clamp and extending upward from the lower triple clamp through a head tube of the frame and through the at least one aperture in the bottom surface of the recess of the upper triple clamp, the upper end being contained completely within the recess of the upper triple clamp and supported by the bottom surface of the recess.

4. The motorcycle of claim 1, wherein the cap has at least one bore therein adapted to accept a fastener utilized in mounting the cap to the upper surface of the upper triple clamp.

5. A motorcycle triple clamp comprising:

a body having an upper surface and a lower surface and a continuous side surface connecting outer edges of the upper and lower surfaces, the upper surface having a recess therein including a bottom surface with at least one aperture, the body defining two outer openings each adapted for receiving a fork tube therein, the body further defining two inner openings each adapted for operatively receiving a riser tube therein, and a cap secured to the upper surface and entirely covering the recess.

6. A motorcycle comprising:

a frame;

a steering fork having a pair of fork tubes;

a lower triple clamp rotatably coupled to the frame and operatively coupled to the pair of fork tubes;

an upper triple clamp rotatably coupled to the frame and operatively coupled to the pair of fork tubes, the upper triple clamp having an upper surface, the upper surface having a recess therein; and a fastener assembly rotatably coupling the frame to the upper and lower triple clamps, the fastener assembly terminating within the recess below the upper surface of the upper triple clamp.

7. The motorcycle of claim 6, further including a cap secured to the upper surface of the upper triple clamp to conceal the recess.

8. The motorcycle of claim 7, wherein the cap has at least one aperture therein adapted to hold an indicator light.

9. The motorcycle of claim 8, wherein the indicator light is integral to an indicator light assembly that is contained within the recess of the upper triple clamp.

10. The motorcycle of claim 7, wherein the cap is sized to cover the recess entirely.

11. The motorcycle of claim 6, further including a cap secured to the upper surface of the upper triple clamp to conceal the fastener assembly within the recess.

12. The motorcycle of claim 6, wherein the fastener assembly includes a steering stem nut within the recess.

13. The motorcycle of claim 12, further including a cap that covers the steering stem nut within the recess.

14. The motorcycle of claim 6, wherein the fastener assembly includes a rod extending between the upper and lower triple clamps.

15. The motorcycle of claim 14, further including a cap secured to the lower surface of the lower triple clamp to conceal the recess.

16. The motorcycle of claim 15, wherein the indicator light is integral to an indicator light assembly that is contained within the recess of the upper triple clamp.

17. The motorcycle of claim 14, further including a cap secured to the upper surface of the upper triple clamp to conceal the fastener assembly within the recess.

18. A motorcycle comprising:

a frame;

a steering fork having a pair of fork tubes;

a lower triple clamp rotatably coupled to the frame and operatively coupled to the pair of fork tubes, the lower triple clamp having a lower surface, the lower surface having a recess therein;

an upper triple clamp rotatably coupled to the frame and operatively coupled to the pair of fork tubes; and a fastener assembly rotatably coupling the frame to the upper and lower triple clamps, the fastener assembly terminating within the recess above the lower surface of the lower triple clamp.

19. The motorcycle of claim 18, wherein the cap has at least one aperture therein adapted to hold an indicator light.

* * * * *